Feb. 8, 1944. J. W. ORENDORFF 2,341,191
MACHINE ELEMENT
Filed Feb. 13, 1942
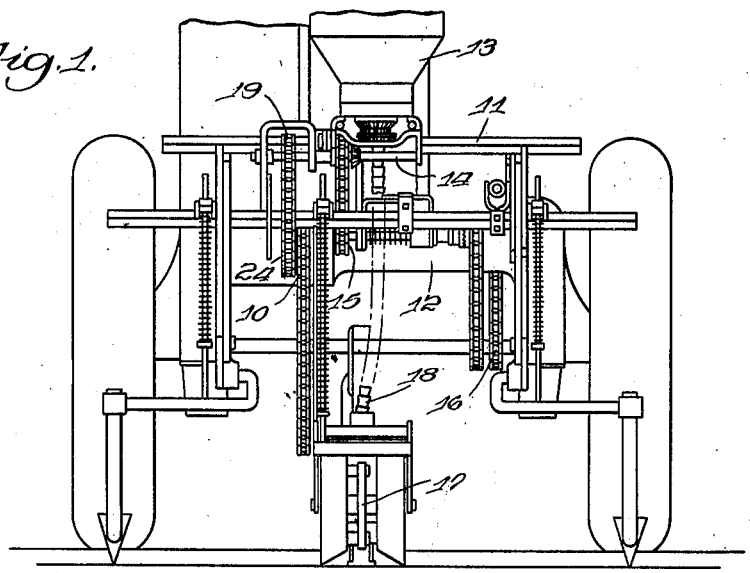
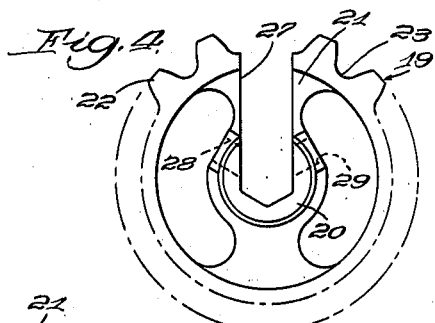
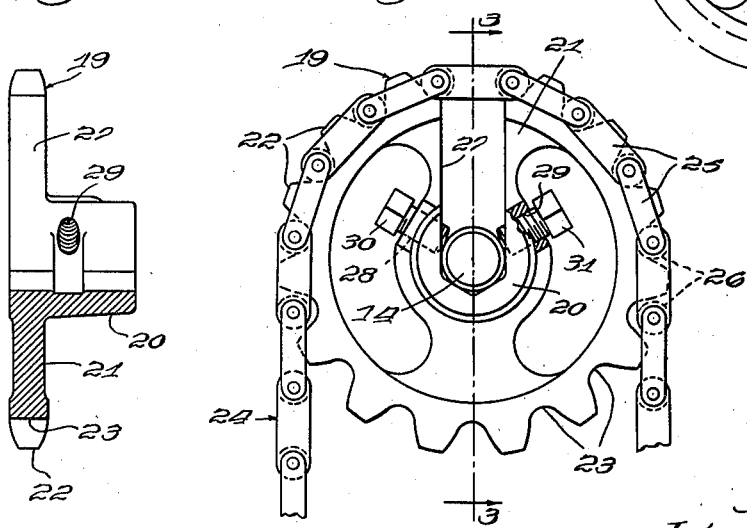
Inventor:
John W. Orendorff,
By Paul O. Pippel
Atty.

Patented Feb. 8, 1944

2,341,191

UNITED STATES PATENT OFFICE 2,341,191

MACHINE ELEMENT

John W. Orendorff, Canton, Ill., assignor to International Harvester Company, a corporation of New Jersey Application February 13, 1942, Serial No. 430,798

3 Claims. (Cl. 74—243)

This invention relates to machine elements and more particularly to a sprocket element adapted for attachment to a shaft without the necessity of sliding the same over one of its ends.

With the connection of driving mechanism to planting arrangements for the purpose of converting a regular planting arrangement into a planting arrangement having a hill-drop mechanism, the hill-drop mechanism must be attached to existing shafts in the regular planting arrangement in order to get its power for the driving of its hill-drop seed valve in the runner structure. In the doing of this, it is desirable to use a sprocket element which can be readily connected to its driving shaft without the necessity for sliding the same over its end.

It is, therefore, the object of the present invention to provide a machine or sprocket element which can be readily constructed and which can be readily attached to its driving shaft.

According to the present invention, the sprocket gear includes a hub portion and a web portion having alternate spaces and teeth in its periphery. Extending radially throughout the hub and web portions is a slot adapted for receiving the shaft to which the sprocket gear is to be connected. The width of this slot is only such as to include one sprocket tooth and parts of the adjacent spaces. Since only one tooth is omitted from the sprocket, the operation of the sprocket is not seriously impaired and therefore a filler element need not be fitted into the slot after the sprocket gear has been attached to the shaft. The chain drive operates the sprocket with substantially the same efficiency as when the removed tooth was included. After the sprocket element has been fitted over the shaft, the same is retained on the shaft by means of securing screws in the hub portion adjacent the walls of the slot and adapted to press upon the top of the shaft.

For other objects and for a better understanding of the invention reference may be had to the following detailed description taken in connection with the accompanying drawing, in which:

Figure 1 is a rear view of a tractor with a planting arrangement having a hill-drop mechanism with a sprocket gear of the type herein disclosed;

Figure 2 is an enlarged detail plan view of the sprocket connected to its shaft and with a chain extended over the same;

Figure 3 is a cross-sectional view of the sprocket shown in Figure 2 and taken along the line 3—3 thereof; and Figure 4 is a view of the sprocket unassembled to the shaft and without the chain extended thereover.

Referring now particularly to Figure 1, there is shown one use of a sprocket of this type as applied to a hill-drop mechanism 10 connected to a general planting arrangement 11 which is in turn connected to the rear of a tractor 12. The general planting arrangement 11 includes a seed hopper 13 having a shaft 14 adapted to be driven by a drive mechanism 15. The drive mechanism 15 is arranged to receive power from a power take-off shaft 16 powered from a tractor motor. To the shaft 14 is connected the hill-drop drive mechanism 10 which serves to drive a seed valve mechanism 17 in the planter runner structure and is floatingly connected to the tractor and adapted to receive the seed from the seed hopper 13 through a vertically extending tube 18. Seed coming from the seed hopper 13 through the tube 18 is delivered to the seed valve 17 and is disposed in the seed furrow by the hill-drop drive mechanism 10.

On connecting the hill-drop drive mechanism to the shaft 14, a sprocket gear 19 embodying the features of the present invention must be adapted to be readily connected to the shaft 14. This sprocket gear 19 takes the form shown in detail in Figures 2, 3, and 4 and embodies the features of the present invention.

This sprocket gear 19 includes a hub portion 20 and a web portion 21 having in its periphery alternate teeth 22 and spaces 23. Over these teeth and spaces a chain 24 having links 25 and rollers 26 is adapted to operate.

Extending radially from the center of the sprocket and throughout the hub and web portions is a slot 27. This slot is only of such width as to receive the shaft 14 and as to relieve the sprocket of but a single tooth 22 and only parts of its adjacent spaces. By keeping this slot of minimum width and by removing only a single tooth the efficiency of the chain 24 over the sprocket is not seriously impaired. The sprocket will be operated practically as well as when the tooth was included. At the same time the ease with which sprockets can be assembled to a shaft intermediate its end has been greatly increased.

In the hub portion 20 and respectively adjacent the web portion 21 of the slot 27 are threaded openings 28 and 29. It will be noted that these openings extend into the slotted walls at an angle therewith so that their respective securing screws 30 and 31 will engage with the top portion on the shaft 14, as viewed in Figure 2. By the setting of these screws, the sprocket element is positively secured to the shaft 14.

With this arrangement of a sprocket there is no need to place a filling element within the slot 27 to thereby consume time in the fixing of the sprocket to the shaft 14. The sprocket 19 carries its own fastening screws, and these are screwed down until portions of the same enter the slot and engage the top portion of the shaft 14. The width of the slot 27 is only such that one link 25 can stretch across the top of the slot 27.

While the sprocket of the present invention has been described in connection with a hill-drop driving mechanism for a planting arrangement, it shall be understood that the invention is confined to the sprocket gear itself serving as a part of the driving mechanism, and hence it would have use in connection with other mechanisms wherein the quick and ready attachment of the mechanism to a power shaft is desired.

While various changes may be made in the detail construction, it shall be understood that such changes shall be within the spirit and scope of the present invention as defined by the appended claims.

What is claimed is:

1. In combination, a shaft, a machine element having a hub portion and a web portion extending radially from the hub portion, said web portion having alternate spaces and teeth in its periphery, said hub and web portions having a radially extending slot adapted to receive the shaft and being only of such width as not materially exceeding that necessary to receive the shaft so as not to materially affect the operation of the element, the portion of said slot in said hub having wall portions abuttable with said shaft for guiding the element and shaft into coaxial relation as the shaft is directed into said slot, and securing screws in threaded relation with said hub for advancement into said slot generally behind the shaft and into abutting relation therewith to retain the same in the aforesaid abutment with said slot wall portions.

2. In combination, a shaft, a machine element having a hub portion and a web portion extending radially from the hub portion, said web portion having alternate spaces and teeth in its periphery, said hub and web portions having a radially extending slot adapted to receive the shaft and being only of such width as not to materially affect the operation of the element, side wall means in said slot for limiting the entrance of the shaft into the slot to a coaxial relation with said machine element, and securing screws entering the hub portion respectively adjacent the sides of the radially extending slot for securing the machine element to the shaft and for also retaining the shaft at said entrance limit, said securing screws being so located in the hub portion and with regard to the shaft as to engage the top portion of the shaft as it lies within the radially extending slot.

3. In a machine element including peripheral and hub portions for rotation coaxially with and upon a shaft, a radial shaft-receiving slot extending radially in said element from within said hub into communication with said periphery, the portion of the slot in said hub having wall portions abuttable with said shaft for guiding the element and shaft into coaxial relation as the shaft is directed into said slot, and securing screws in threaded relation with said hub for advancement into said slot generally behind said shaft and into abutting relation therewith to retain the same in the aforesaid abutment with said slot wall portions.

JOHN W. ORENDORFF.